No. 842,519. PATENTED JAN. 29, 1907.
W. H. BROTHERS.
SPRING HINGE.
APPLICATION FILED DEC. 6, 1905.
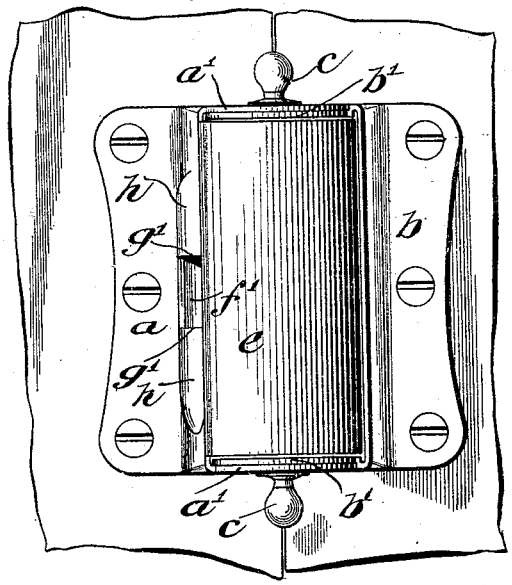
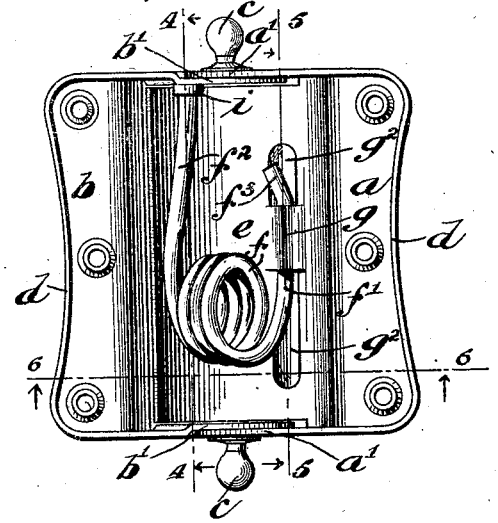
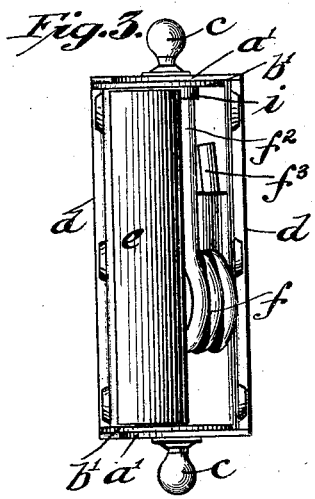
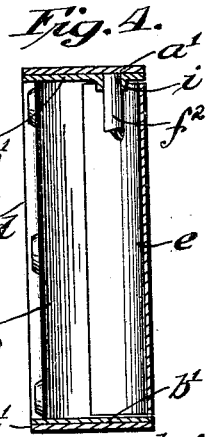
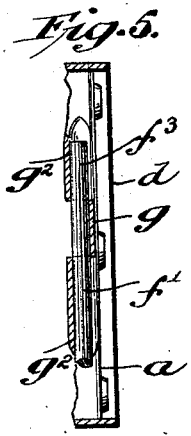
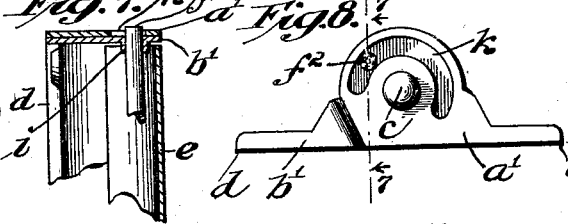
Attest:
William H. Brothers
Inventor:
by Geo. L. Wheelock
Atty

UNITED STATES PATENT OFFICE.

WILLIAM H. BROTHERS, OF CLEVELAND, OHIO, ASSIGNOR TO THE COLUMBIAN HARDWARE COMPANY, OF CLEVELAND, OHIO, A CORPORATION OF OHIO.

SPRING-HINGE.

No. 842,519.  Specification of Letters Patent.  Patented Jan. 29, 1907.

Application filed December 6, 1905. Serial No. 290,597.

*To all whom it may concern:*

Be it known that I, WILLIAM H. BROTHERS, a citizen of the United States, residing at Cleveland, in the county of Cuyahoga, State of Ohio, have invented certain new and useful Improvements in Spring-Hinges, of which the following is a specification.

The present invention relates to spring-hinges which are double-acting in the sense that they act to hold a door closed and also to hold it open; and the invention more particularly relates to screen-door hinges.

The object of my invention is to provide a simple, durable, and effective spring-hinge the parts of which are readily assembled and the leaves of which are most suitably made of struck-up metal, suitably pivoted, and actuated by a spring.

In order that my invention may be fully understood, I will proceed to describe the same with reference to the accompanying drawings, in which—

Figure 1 is a front elevation of my improved spring-hinge. Fig. 2 is a rear elevation thereof. Fig. 3 is a rear elevation of the hinge with the leaves closed, as when the door is wide open. Fig. 4 is a section on the line 4 4 of Fig. 2 viewed from the left. Fig. 5 is a sectional view, line 5 5, Fig. 2, viewed from the right. Fig. 6 is a transverse section of the hinge on the line 6 6, Fig. 2, viewed upwardly. Fig. 7 is a detail sectional view, line 7 7, Fig. 8, showing a modified form of the invention; and Fig. 8 is an end elevation of the modified form of hinge.

Referring to Figs. 1 to 5, inclusive, the hinge is provided with leaves or members $a$ $b$, which are advantageously struck and bent up from sheet metal. These leaves are respectively provided with ears or lugs $a'$ $b'$, so that the leaves may be pivotally connected by means of ornamental pins or pintles $c$, which are preferably riveted to the ears or lugs $b'$. The leaves are preferably provided with strengthening and reinforcing edge flanges $d$. The leaf $a$ is provided adjacent the leaf $b$ with an outwardly-curved and approximately semicylindrical cover or back portion $e$, which is out of the plane of and substantially fills the gap between the main bodies of the two leaves by reason of the fact that the edge of the said cover $e$ extends closely adjacent to the inner outturned edge of the leaf $b$ and that the outer ends of the cover extend in close juxtaposition to the edges of ears or lugs $b'$. Thus a complete housing or inclosure is provided for the actuating-spring $f$, so that it will be protected from the elements.

The actuating-spring $f$ is composed of coils of suitable spring-wire, the ends of which extend tangentially to the coils in the same general direction. The said spring ends form arms $f'$ $f^2$, the first of which is firmly and securely fastened to the leaf $a$, while the other constitutes the actuating arm or end of the spring. For the purpose of mounting and fixing the spring in the hinge the leaf $a$ at its portion intermediate the main body and the cover $e$ is first made with transverse slits, and then the metal is so formed and bent as that a longitudinal sleeve or socket $g$ is formed by that portion of the metal which lies between the two slits, which slits by the straining and bending of the metal are formed into the open ends of the sleeve or socket. Said sleeve or socket $g$ is bent inwardly, while those portions of the leaf $a$ which are beyond the sleeve or socket are bent or depressed outwardly at $g'$ to form inner longitudinal grooves or depressions $g^2$, which permit the arm $f'$ of the spring to be slipped longitudinally through the sleeve or socket. The outer end of the arm $f'$ is bent out of line at $f^3$ with the other portion of the arm, so that by the described combined means of attachment the entire spring is securely fixed to and mounted in the leaf $a$ and its cover $e$. By reason of the depressions or grooves $g^2$ on the inner side of the leaf $a$ there are formed on the outer face of leaf $a$ a substantially semicylindrical or rounded beads $h$, between which beads at the open side of socket $g$ a considerable portion of the length of the spring-arm $f'$ is exposed to view. Thus not only is the spring securely and permanently mounted on the leaf $a$, but the manner of attaching it thereto gives a distinct and unique appearance to the exterior of the leaf, so that the source of the manufactured hinges will have a distinct means of identification. The actuating-arm $f^2$ of the spring $f$ has its extremity inserted into a perforated boss $i$, the perforation extending, preferably, into the ear $b'$, on which said boss is formed.

It is obvious from Fig. 6 that the spring, through the action of its actuating-arm $f^2$ on the leaf $b$, throws the leaves into one plane, in which position the door will be shut, and that when the door is swung wide open the spring will be strained until the door is almost thrown back to its full open position, and that as soon as the spring is strained just as much as permissible and the end of arm $f^2$ has passed the "dead-point" the spring will then act in the opposite direction to throw the door fully back into its wide-open position, there holding the door. The action of the spring, therefore, is to hold the door closed and also to hold it wide open.

In the modification shown in Figs. 7 and 8 the actuating end $f^2$ of the spring is elongated and extended through both ears $a'$ $b'$. The ear $a'$ would in that case require a segmental slot $k$ to receive the protruding end of the spring.

The construction described enables the hinges to be cheaply manufactured, and at the same time they will be both efficient and durable. They are preferably bronzed or otherwise suitably plated.

Having thus described my invention, what I claim is—

In a spring-hinge, the combination of two sheet-metal hinge-leaves provided with pivotally-connected ears, one of said leaves being provided with a longitudinal sleeve or socket closed toward the inside of the hinge and open to the outside thereof, the said leaf having longitudinal interior grooves or depressions at the opposite ends of said sleeve or socket, and the other of said leaves having one of its ears provided with a perforation at one side of the pivot connections, the adjacent leaf having a curved slot and a spring having two arms, one of which is inserted through the said sleeve or socket and seated in said groove or depression, and the extremity of the other of which arms is inserted through the said perforation into said slot, for substantially the purposes set forth.

Signed at Cleveland, Ohio, this 27th day of November, 1905.

WILLIAM H. BROTHERS.

Witnesses:
 MARGARET RILEY,
 THOMAS BIGGERSTAFF.